United States Patent
Hartenstein et al.

(10) Patent No.: US 7,741,239 B2
(45) Date of Patent: Jun. 22, 2010

(54) METHODS OF REGENERATION OF SCR CATALYST POISONED BY PHOSPHOROUS COMPONENTS IN FLUE GAS

(75) Inventors: Hans-Ulrich Hartenstein, Cramerton, NC (US); Thies Hoffmann, Lake Wylie, SC (US)

(73) Assignee: Evonik Energy Services LLC, Kings Mountain, NC (US)

( * ) Notice: Subject to any disclaimer, the term of this patent is extended or adjusted under 35 U.S.C. 154(b) by 0 days.

(21) Appl. No.: 12/287,365

(22) Filed: Oct. 8, 2008

(65) Prior Publication Data

US 2009/0233787 A1 Sep. 17, 2009

Related U.S. Application Data

(60) Provisional application No. 61/068,966, filed on Mar. 11, 2008.

(51) Int. Cl.
*B01J 38/00* (2006.01)
*B01J 38/48* (2006.01)
*B01J 38/64* (2006.01)

(52) U.S. Cl. .............. 502/25; 502/20; 502/22
(58) Field of Classification Search ........ None
See application file for complete search history.

(56) References Cited

U.S. PATENT DOCUMENTS

| | | | |
|---|---|---|---|
| 3,674,707 A | 7/1972 | Pieters et al. | 502/26 |
| 4,329,510 A * | 5/1982 | Uno et al. | 568/411 |
| 4,407,733 A | 10/1983 | Birkenstock et al. | 502/174 |
| 4,615,991 A | 10/1986 | Obayashi et al. | 502/28 |
| 4,656,147 A | 4/1987 | Iida et al. | 502/26 |
| 5,120,690 A | 6/1992 | Jung et al. | 501/155 |
| 5,151,256 A | 9/1992 | Kato et al. | 423/210 |
| 5,283,052 A | 2/1994 | Hums | 422/223 |
| 5,394,610 A | 3/1995 | Stoephasius et al. | 29/890 |
| 5,522,941 A | 6/1996 | Uchinami et al. | 134/37 |
| 5,571,771 A | 11/1996 | Abel et al. | 502/330 |
| 5,785,937 A | 7/1998 | Neufert et al. | 423/213.2 |
| 5,820,693 A | 10/1998 | Patchett et al. | 134/22.12 |
| 5,869,419 A | 2/1999 | Obayashi et al. | 502/305 |
| 5,873,329 A | 2/1999 | Heering et al. | 122/7 R |
| 5,882,422 A | 3/1999 | Obayashi et al. | 134/1 |
| 5,953,911 A | 9/1999 | Guth et al. | 60/295 |
| 6,025,292 A | 2/2000 | Obayashi et al. | 502/27 |
| 6,080,696 A | 6/2000 | Duke et al. | 502/27 |
| 6,136,222 A | 10/2000 | Friesen et al. | 252/184 |
| 6,232,254 B1 | 5/2001 | Schneider et al. | 502/22 |
| 6,241,286 B1 | 6/2001 | Ogura et al. | 281/29 |
| 6,241,826 B1 | 6/2001 | Dittmer et al. | 134/1 |
| 6,299,695 B1 | 10/2001 | Gilgen | 134/1 |
| 6,387,836 B1 | 5/2002 | Dorr et al. | 502/22 |
| 6,395,665 B2 | 5/2002 | Nojima et al. | 502/25 |
| 6,455,456 B1 | 9/2002 | Spokoyny | 502/20 |
| 6,482,762 B1 | 11/2002 | Ruffin et al. | 502/33 |
| 6,484,733 B2 | 11/2002 | Budin et al. | 134/22.19 |
| 6,576,585 B2 | 6/2003 | Fischer et al. | 502/309 |
| 6,596,661 B2 | 7/2003 | Neufert | 502/28 |
| 6,631,727 B2 | 10/2003 | Schneider et al. | 134/110 |
| 6,641,785 B1 | 11/2003 | Neufert et al. | 422/177 |
| 6,913,026 B2 | 7/2005 | Winnestaffer et al. | 134/22.18 |
| 6,929,701 B1 | 8/2005 | Patel et al. | 134/1 |
| 7,384,882 B2 | 6/2008 | Sun et al. | 502/27 |
| 7,569,506 B2 | 8/2009 | Foerster | 502/27 |
| 2001/0006929 A1 | 7/2001 | Budin et al. | 502/24 |
| 2002/0006860 A1 | 1/2002 | Schneider et al. | 502/22 |
| 2004/0137209 A1 | 7/2004 | Zeller et al. | 428/304.4 |
| 2004/0163676 A1 | 8/2004 | Winnestaffer et al. | 134/17 |
| 2005/0119109 A1 | 6/2005 | Schneider et al. | 502/22 |
| 2006/0060219 A1 | 3/2006 | Rabitsch et al. | 134/22.11 |
| 2006/0094587 A1 | 5/2006 | Lee et al. | 502/27 |
| 2006/0135347 A1 | 6/2006 | Schluttig et al. | 502/25 |
| 2006/0148639 A1 | 7/2006 | Foerster | 502/27 |
| 2007/0032373 A1 | 2/2007 | Matsumoto et al. | 502/20 |
| 2007/0161509 A1 | 7/2007 | Bruggendick et al. | 705/37 |
| 2008/0115800 A1 | 5/2008 | Blohm | 134/1 |
| 2009/0285741 A1* | 11/2009 | Rasmussen et al. | 423/239.1 |

FOREIGN PATENT DOCUMENTS

| | | |
|---|---|---|
| CA | 2336562 | 1/2000 |
| DE | 38 10 137 A1 | 10/1989 |
| DE | 38 16 600 A1 | 11/1989 |
| DE | 40 13 720 | 10/1991 |
| DE | 42 17 738 | 12/1993 |
| DE | 43 00 933 C1 | 5/1994 |

(Continued)

OTHER PUBLICATIONS

PCT International Search Report.

(Continued)

*Primary Examiner*—Melvin C Mayes
*Assistant Examiner*—Sarah Van Oudenaren
(74) *Attorney, Agent, or Firm*—K&L Gates LLP

(57) ABSTRACT

A method of regeneration of a SCR catalyst for use in high temperature thermal processes such as in a power plant facility burning fossil fuels, bio-based fuels, or a combination thereof, wherein the catalyst is poisoned by phosphorous components in the flue gas and the catalyst is treated using a base, preferably an alkali metal hydroxide.

14 Claims, No Drawings

FOREIGN PATENT DOCUMENTS

| | | |
|---|---|---|
| DE | 195 33 912 A1 | 3/1997 |
| DE | 196 28 212 A1 | 1/1998 |
| DE | 197 23 796 | 12/1998 |
| DE | 198 04 522 | 2/1999 |
| DE | 198 29 916 A1 | 1/2000 |
| DE | 102 18 380 A1 | 11/2003 |
| DE | 102 22 915 A1 | 1/2004 |
| DE | 102 41 004 A1 | 3/2004 |
| DE | 102 42 081 A1 | 3/2004 |
| DE | 103 25 779 A1 | 1/2005 |
| EP | 0 335 240 A2 | 3/1989 |
| EP | 0 353 467 A1 | 2/1990 |
| EP | 0 571 664 | 12/1993 |
| EP | 0 677 320 | 10/1995 |
| EP | 0 763 589 B1 | 3/1997 |
| EP | 0 824 973 A2 | 2/1998 |
| EP | 0 910 472 B1 | 4/1999 |
| EP | 19990936166 | 7/1999 |
| EP | 1 098 703 | 5/2001 |
| EP | 1 107 824 | 6/2001 |
| EP | 1 797 954 | 6/2007 |
| EP | 1 833 606 | 9/2007 |
| GB | 1283737 | 8/1972 |
| JP | 58 30345 | 2/1983 |
| WO | WO 95/20434 | 8/1995 |
| WO | WO 98/02248 | 1/1998 |
| WO | WO 98/55230 | 12/1998 |
| WO | WO 00/01483 | 1/2000 |
| WO | WO 00/12211 | 3/2000 |
| WO | WO 03/099437 A1 | 12/2003 |
| WO | WO 2004/022226 A1 | 3/2004 |
| WO | WO 2004/026447 A1 | 4/2004 |
| WO | WO 2004/073835 A1 | 9/2004 |
| WO | WO 2004/076067 A1 | 9/2004 |
| WO | WO 2006/072569 | 7/2006 |

OTHER PUBLICATIONS

JP 56037048 A (Kazutoyo et al.) Apr. 10, 1981 Abstract.
JP 2007/297248 A (Hiroshi et al.) Nov. 15, 2007 Abstract.
Emissions Control, *SCR Maintenance Fundamentals*, Ken Wicker and Jim Staudt, POWER, Jun. 2004, pp. 52-57.
*The Role of Oxalate in Accelerating the Reductive Dissolution of Hematite ($a$-$Fe_2O_3$) by Ascorbate*, Steven Banwart, Simon Davies, and Werner Stumm, Colloids and Surfaces, vol. 39, pp. 303-309 (1989).
*Regeneration of Commercial $TiO_2$-$V_2O_5$-$WO_3$ SCR Catalysts Using in Bio Fuel Plants*, Raziyeh Khodayari and C.U. Ingemar Udenbrand, Appliwed Catalysis B. Environmental, vol. 30, pp. 87-99 (2001).
*Differenzierung der Eisenoixde des Bodens durch Extraktion mit Ammoniumoxalat-Losung*, Dr. Von U. Scwertmann May 3, 1964, pp. 194-202.
Wypych, George Knovel Solvents—A Properties Database. Acetic Acid. ChemTec Publishing. Copyright 2008. Online version available at http://knvel.com/web/portal/browse/display?_EXT_KNOVEL_DISPLAY_bookid=635&verticalID=0.
Wypych, George Knovel Solvents—A Properties Database. Formic Acid. ChemTec Publishing. Copyright 2008. Online version available at http://knvel.com/web/portal/browse/display?_EXT_KNOVEL_DISPLAY_bookid=635&verticalID=0.
U.S. Appl. No. 11/640,475, filed Dec. 15, 2006, Brüggendick, et al.
U.S. Appl. No. 12/287,347, filed Oct. 8, 2008, Hartenstein, et al.
U.S. Appl. No. 12/287,365, filed Oct. 8, 2008, Hartenstein, et al.
U.S. Appl. No. 12/384,159, filed Apr. 1, 2009, Bruggendick, et al.

* cited by examiner

METHODS OF REGENERATION OF SCR CATALYST POISONED BY PHOSPHOROUS COMPONENTS IN FLUE GAS

CROSS-REFERENCE TO RELATED APPLICATIONS

This application claims the benefit of U.S. provisional patent application 61/068,966, filed Mar. 11, 2008, herein incorporated by reference.

FIELD OF THE INVENTION

The present invention relates to a method of regeneration of any type of selective catalytic reduction (SCR) catalyst, more particularly to a method of regeneration of SCR catalyst poisoned, such that it is deactivated, by phosphorous components in flue gas.

BACKGROUND OF THE INVENTION

High temperature thermal processes, for example, the generation of steam for the production of electricity in power plants utilizing fossil fuels, often create environmentally harmful by-products. These compounds, specifically nitrous oxides (NOx), have to be removed from the flue gases of the high temperature thermal processes before being discharged to the environment, for example before exiting a power plant and contacting the environment. The standard for removing NOx from flue gases is the selective catalytic reduction (SCR) process, where a reducing reagent, typically ammonia, is injected, mixed into the flue gas, and sent through a catalytic reaction chamber where the catalyst facilitates the reduction of NOx with the reducing agent to form elemental nitrogen and water. The catalyst, often referred to as a DeNOx catalyst, aids these reactions and is typically constructed of titanium dioxide containing the oxides of transition metals such as, for example, vanadium, molybdenum, and tungsten to act as catalytically active components. The catalyst is arranged on plates, in a honeycomb fashion or as a corrugated structure and placed parallel to the direction of flue gas flow. However, during operation, the catalyst undergoes a loss of activity and efficiency as a result of plugging with ash and deactivation of the active components from certain compounds contained in flue gas which are poisonous to the catalyst.

There is also a trend in the industry to find alternative fuel sources to fossil fuels. One such example is the use of bio-based fuels such as bio-residues and biomass which refer to living and recently dead biological material that can be used as fuel or for industrial production. Production of biomass as an alternative fuel source is a growing industry. Such materials may include plant matter or animal matter and biodegradable wastes that can be burnt as fuel and typically exclude organic material which has been transformed by geological processes into substances such as coal or petroleum.

However, the use of bio-based fuels such as biomass and bone meal used alone or in combination with fossil fuel present new challenges for catalyst regeneration. In addition to many of the flue gas constituents poisonous to the catalyst that typically affect the activity of a catalyst used in thermal process flue gas cleaning such as a power plant burning traditional fossil fuels, there are other compounds poisonous to the catalyst that present greater challenges for SCR catalyst regeneration. For example, the regeneration of phosphorous poisoned catalysts due to the deactivation of the catalysts presents a challenge.

According to an article entitled, "Deactivation Mechanisms of SCR Catalysts During the Co-Combustion of Bio-Residues" of J. Beck, S. Unterberger, K. Hein, the substitution of fossil fuels by bio-residues such as sewage sludge, waste wood or meat and bone meal is discussed as being of increasing interest for reduction of carbon dioxide ($CO_2$) emissions. According to the article, during the co-combustion of these fuel mixes in existing coal-fired power plants, an increased deactivation of SCR-DeNOx catalysts is observed. The same effect can be observed when certain fossil fuels are burned or when other flue gases exposing a similar composition are treated by the SCR process. Analyses of deactivated catalyst samples indicate that the high concentration of phosphorus and sodium compounds as constituents of bio-residues has a significant influence on the deactivation rate of the catalyst. The article states that to determine the effect of these compounds, lab-scale experiments were carried out using doped synthetic flue gas, and in bench scale tests the behavior of phosphorus was investigated during the combustion of coal and phosphorus rich secondary fuel. Analyses of sub-bituminous Powder River Basin (PRB) coal also indicate the presence of organically bound alkali and phosphorus species. Recent operational experiences showed that in case of meat and bone meal (MBM) co-combustion in German utility boilers a share of 4 wt-% MBM leads already to a severe deactivation of the installed SCR-catalyst. Phosphorus and alkali compounds in the fuel were considered as primary deactivating elements.

In Table A, a typical elemental breakdown and the concentration percentages of many alternative bio-based fuels used in power plants are shown. For example, Table A sets forth sources that include wood, corn, sewage sludge, and meat and bone meal (MBM). As shown in Table A, phosphorous represents a high concentration in such fuels and accounts for a large percentage of what needs to be removed from the catalyst by regeneration of the SCR catalyst.

TABLE A

| Element | Ash Analysis | Wood* (Concentration %) | Corn (Concentration %) | Sewage Sludge (Concentration %) | Bone Meal MBM (Concentration %) |
|---|---|---|---|---|---|
| Silicon (Si) | $SiO_2$ | 20-70 | 0.5-5 | 5.6-25.7 | — |
| Aluminum (Al) | $Al_2O_3$ | 5-10 | 0.1-1 | 1.1-8.5 | — |
| Calcium (Ca) | CaO | 2-30 | 0.1-1 | 1.4-42.9 | — |
| Sodium (Na) | $Na_2O$ | 1-10 | 0.1-2 | 0.1-0.8 | 4-7 |
| Potassium (K) | $K_2O$ | 2-15 | 10-30 | 0.3-1.6 | 1.5-4 |
| Phosphorous (P) | $P_2O_5$ | 1-5 | 10-60 | 1.2-4.4 | 25-40 |

*Includes pallet grindings, wood chips, mill residue, and clean wood waste

Thus, there is a need for a method for the regeneration of SCR catalyst that is particularly deactivated from phosphorous components in the flue gases from thermal processes such as power plants, especially in case of co-firing biomass instead of only coal.

SUMMARY OF THE INVENTION

The present invention is for a method of regeneration of SCR catalyst used for the cleaning of flue gases from thermal processes such as power plants burning fossil fuels, bio-based fuels, or a combination thereof, wherein the catalyst is poisoned by phosphorous components contained in the flue gases and the catalyst is treated using a base, preferably an alkali metal hydroxide.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

DETAILED DESCRIPTION OF THE INVENTION

The following detailed description of the invention is merely exemplary in nature and is in no way intended to limit the invention, its application, or uses.

An advantage of the method of the present invention is that the NOx removal (DeNOx) performance of a catalyst can be regained with the method of the present invention to a level that can approximate or achieve the activity of a new catalyst. In the method of the present invention of selective catalytic reduction (SCR) catalyst cleaning and regeneration, elimination of catalyst poisoning compounds occurs and is combined with a re-impregnation of active components onto the catalyst to regain maximum catalytic performance. The method of the present invention is particularly suitable for the removal of phosphorus, which poisoned the catalyst, from said SCR catalyst in order the regain the lost activity of the catalyst. The term "phosphorous-poisoned catalyst," as used herein, refers to a catalyst comprising about 0.3 weight percent (%) or more of phosphorous measured as phosphorous pentoxide ($P_2O_5$), wherein the weight percent is based upon the total weight of a portion of the catalyst used for analysis which is representative of the catalyst.

The method of the present invention comprises removing a phosphorous-poisoned catalyst from a power plant facility. The power plant facility may burn fuel that includes, but is not limited to, fossil-fuel, bio-based fuel, or a combination thereof. The catalyst is analyzed, for example, by composition and for contaminant type and level. The catalyst may be of any shape or size including, but not limited to, honeycomb shaped, plate-type, and corrugated-type. Power plant facilities utilize varying sources of fuel with differing qualities and origins, all of which alters the extent of contamination. Power plant facilities that burn bio-based fuels typically have a higher level of phosphorous contamination on the catalyst as opposed to other catalyst poisons.

In the method of the present invention, the catalyst is dry pre-cleaned. A dry pre-cleaning is typically conducted without water by physical means to remove physical contaminants such as dust and fly ash before the catalyst is chemically cleaned or washed and reactivated. Physical means include, but are not limited to, vacuum, brush, shaking, scraping, and disassembling the catalyst casings, for example to separate trapped fly ash. Disassembling the catalyst casings relates to a particular type of catalyst comprised of multiple boxes. For this type of catalyst, the boxes are typically removed from the casing's frame in order to be dry pre-cleaned. A catalyst that is laden with dust and fly ash creates a physical hindrance to the reactions that are to take place to clean the flue gas. The fly ash is typically cleared by compressed air, industrial vacuum cleaners, or simple gravity.

After dry pre-cleaning, the catalyst is optionally wet pre-washed. Wet pre-washing refers to washing of the catalyst by a hose or pressure washer, for example. The water used for pre-wet washing includes, but is not limited to, recycled water, city water, process water, well water, and deionized water. Salt layers can also form a barrier in addition to fly ash, and salts are typically removed by wet pre-washing.

After dry pre-cleaning, wet pre-washing, or a combination thereof, the catalyst is chemically cleaned. The chemical cleaning of the catalyst typically occurs by immersing the catalyst in a soaking bath and optionally an ultrasonic treatment.

The catalyst is placed in a soaking bath for soaking and washing of the catalyst or a combination thereof. The soaking bath is typically housed in a tank with optionally air being blown through the catalyst during soaking. The soaking bath comprises an aqueous solution of inorganic bases, inorganic acids, or a combination thereof. Elimination of catalyst poisoning contaminants is achieved by a moderately strong base or moderately strong acid. The aqueous solution comprises water of the type which includes, but is not limited to, recycled water, city water, process water, well water, and deionized water. The soaking bath may optionally comprise other chemical additives including, but not limited to, surface active substances. The time period for the soaking bath is at least thirty minutes. Preferably, the time period for the soaking bath is from about 3 to 6 hours although there is no limit on the maximum time period for the soaking bath in accordance with the present invention. During the soaking bath, chemicals and water may be added to replace any water, for example, that is removed and sent, for example, to a wastewater system.

After the soaking bath, the catalyst is optionally placed or submerged into a tank where it is subjected to an ultrasonic treatment. The ultrasonic treatment tank comprises water and a base, acid, or combination thereof. One or more catalysts can be treated at the same time. Ultrasonic transducers are placed around the catalyst, for example on top of the catalyst and another on the bottom of the catalyst. Each of the catalysts is ultrasonically treated simultaneously, for example from the top and the bottom for a period of time such as, for example 30 to 45 minutes although longer or shorter periods of time are in accordance with the method of the present invention. The treatment solution may be circulated and/or replaced during the course of treatment.

According to the method of the present invention, in either the soaking bath, the ultrasonic treatment, or a combination of both the soaking bath and the ultrasonic treatment, the bath or treatment solution preferably comprises an inorganic base for elimination of the contaminants including phosphorous. Alkaline reacting salts, such as carbonates, can also be used depending on availability and expense. According to the method of the present invention, for phosphorous removal, the bath or treatment solution comprises an inorganic base(s) that is selected from the group of alkali metal hydroxides. Preferred alkali metal hydroxides include, but are not limited to, sodium hydroxide (NaOH) and potassium hydroxide (KOH). In accordance with the method of the present invention, the alkali metal hydroxides have a pH in the range of above 8.5, preferably about 10 to about 14, more preferably from about 12 to about 13. Alkali metal hydroxide is preferably present in a concentration range of from about 0.1 weight % to about 4 weight % based upon the weight of the bath or solution. The soaking bath or ultrasonic treatment solution has a temperature up to about 176° F. (80° C.), more preferably in the range of from about 60° F. (15.5° C.) to about 140° F. (60° C.), most preferably in the range of from about 120° F. (48.8° C.) to about 130° F. (54.4° C.).

Following the soaking bath and/or ultrasonic treatment in a basic solution, the method of the present invention comprises treating the catalyst in an acidic solution referred to as neutralization. Among the purposes of the acid treatment is to remove excess base or alkali solution and activate the reaction centers of the catalyst. The acids to be used may be organic or inorganic. After neutralization, the catalyst is subsequently rinsed and dried.

After the catalyst is rinsed and dried, the catalyst is analyzed to determine the concentration of active components such as any transitional metallic oxides that are comprised in the active sites on the catalyst. A significant loss of active components necessitates the re-impregnation of the catalyst by treating the catalyst in an aqueous solution comprising water and inorganic and organic substances with various concentrations of metal compounds. The catalyst is subsequently dried to prepare the catalyst for service.

Alkali metal hydroxides as opposed to alkaline earth metal hydroxides are used in accordance with the method of the present invention for the removal of phosphorous. For example, the use of alkali metal hydroxides as opposed to alkaline earth metal hydroxides dramatically increases the concentration of phosphorous in the solution thereby improving the regeneration of the catalyst. Another advantage of alkali metal hydroxides as opposed to alkaline earth metal hydroxides for phosphorous removal is that alkali metal hydroxides are easier to remove during various stages of regeneration as compared to alkaline earth metal hydroxides.

The present invention may be better understood by reference to the following non-limiting examples, set forth below.

Example 1

In this example, 15 grams of a SCR catalyst were obtained and submerged for thirty (30) minutes in 100 mL of each of the solution set forth in Tables 1 and 2. The pH of each solution was measured using a pH meter. The temperature of each solution was measured using a mercury filled glass thermometer. The concentration of phosphate in solution was measured in ppm for each solution.

TABLE 1

| Solution | pH | Phosphate concentration in solution (ppm) | Temperature |
|---|---|---|---|
| $H_2O$ | 6.3 | 30 | Room Temp. |
| $H_2O$ | 6.3 | 30 | Room Temp. |
| $Ca(OH)_2$ | 4.5 | 40 | Room Temp. |
| $Ca(OH)_2$ | 8.5 | 30 | Room Temp. |
| $Ca(OH)_2$ | 8.5 | 30 | Room Temp. |
| $Ca(OH)_2$ | 10.5 | 40 | Room Temp. |
| $Ca(OH)_2$ | 10.5 | 30 | Room Temp. |
| $Ca(OH)_2$ | 11.8 | 40 | Room Temp. |
| $Ca(OH)_2$ | 11.75 | 40 | Room Temp. |
| $Ca(OH)_2$ | 11.8 | 50 | 125° F. |
| NaOH | 8.5 | 50 | Room Temp. |
| NaOH | 8.5 | 60 | Room Temp. |
| NaOH | 12.1 | 100 | Room Temp. |
| NaOH | 12.1 | 120 | Room Temp. |
| NaOH | 12.1 | 220 | 125° F. |
| NaOH | 12.1 | 350 | 175° F. |
| NaOH | 12.9 | 250 | Room Temp. |
| NaOH | 12.9 | 400 | 125° F. |
| NaOH | 12.9 | 500 | 175° F. |
| NaOH | 13.9 | 250 | Room Temp. |
| NaOH | 13.9 | 400 | 125° F. |
| NaOH | 13.9 | 550 | 175° F. |
| $H_2SO_4$ | 2.0 | 70 | Room Temp. |
| $H_2SO_4$ | 2.0 | 80 | Room Temp. |
| $NH_4OH$ | 10.85 | 50 | Room Temp. |
| $NH_4OH$ | 10.85 | 40 | Room Temp. |

TABLE 2

| Solution | pH | Phosphate concentration in solution (ppm) | Temperature |
|---|---|---|---|
| $H_2O$ | 2.5 | 30 | 140° F. |
| $Ca(OH)_2$ | 3.4 | 30 | 140° F. |
| $Ca(OH)_2$ | 3.5 | 30 | Room Temp. |
| $Ca(OH)_2$ | 4.4 | 30 | Room Temp. |
| $Ca(OH)_2$ | 4.5 | 30 | 140° F. |
| NaOH | 3.5 | 30 | Room Temp. |
| NaOH | 3.5 | 30 | 140° F. |
| NaOH | 4.4 | 30 | 140° F. |
| NaOH | 4.5 | 30 | Room Temp. |

The following observations with respect to the phosphorous removal rate were made based upon measurements of the phosphate in solution. It was observed from the data in Table 1 the NaOH removed more phosphorous from the catalyst than the $CaOH_2$. It was also observed from the data in Table 1 that the phosphorous removal rate with NaOH did not increase to the same extent with a pH at or below 8.5 as it did at a pH higher than 8.5. It was also observed from the data in Table 1 that even greater phosphorous removal rates with NaOH were obtained at temperatures higher than room temperature. It was also observed from Table 2 that a low pH had no effect on phosphorous removal as it can be seen that the phosphorous removal rate of an alkali solution with a pH of less than 5 and/or an earth alkali solution was no greater than the phosphorous removal rate of water alone.

Example 2

An XRF analysis of an SCR catalyst from a power plant was performed pursuant to VGB-R 302 H e, $2^{nd}$ edition (English equivalent is EPRI's Protocol for Laboratory Testing of SCR Catalyst Samples: $2^{nd}$ edition (EPRI 1014256). It was observed from the data resulting from the XRF analysis set forth in Table 3 that arsenic was not the reason for the reduction of the catalyst's activity and, therefore, not the basis for regeneration of the catalyst. In Table 3 below, the same catalyst was tested each time. The upper part of Table 3 indicates the activity of the catalyst. The new catalyst had an activity of 42.7 meter/hour, which over time was reduced by almost 50%. The catalyst's activity and $SO_2/SO_3$ conversion rate was determined with bench scale testing and analysis performed pursuant to VGB-R 302 H e, $2^{nd}$ edition. It was observed from the data in Table 3 that the deactivation of the catalyst was a blinding layer ($SiO_2$, CaO, $SO_3$) and poisoning with sodium (Na), magnesium (Mg), potassium (K), and most importantly phosphorous (P). The "small" amount of arsenic (under 0.2 was considered "small") was considered an insignificant factor for catalyst deactivation. By removing Ca, Na, K, and Mg from the catalyst (washing with water), some activity was gained back, but by removing P from the catalyst, the catalyst was restored to about 85-90% of its original catalytic activity. It was observed from the data in Table 3 that there was nearly a 66% reduction in phosphorous on the catalyst with a cleaning of 2% NaOH solution as compared to a cleaning with water only and nearly a 72% reduction in phosphorous on the catalyst with a cleaning of 2% NaOH as compared to no cleaning treatment.

TABLE 3

|  | Power plant | | |
|---|---|---|---|
|  | Power Plant A | Power Plant A | Power Plant A |
| Treatment | None | Cleaning with water | Cleaning with 2% NaOH solution |
| Activity of honey-comb shaped catalyst (meter/hour) | 24.03 | 30.7 | 37.0 |
| Activity of honey-comb shaped catalyst - New (meter/hour) | 42.7 | 42.7 | 42.7 |
| CHEMICAL COMPOSITION OF CATALYST | | | |
| $SiO_2$ (weight %) | 11.7 | 15.6 | 4.5 |
| $Al_2O_3$ (weight %) | 2.9 | 2.6 | 1.1 |
| $Fe_2O_3$ (weight %) | 1.14 | 1.2 | 1.1 |
| $TiO_2$ (weight %) | 63.9 | 68.6 | 83.3 |
| CaO (weight %) | 2.2 | 0.97 | 1.1 |
| MgO (weight %) | 0.24 | 0.18 | 0.1 |
| BaO (weight %) | 0.03 | 0.03 | 0.03 |
| $Na_2O$ (weight %) | 0.19 | 0.03 | 0.12 |
| $K_2O$ (weight %) | 0.21 | 0.06 | 0.03 |
| $SO_3$ (weight %) | 8.8 | 1.14 | 0.32 |
| $P_2O_5$ (weight %) | 0.64 | 0.53 | 0.18 |
| $V_2O_5$ (weight %) | 0.47 | 0.48 | 0.35 |
| $WO_3$ (weight %) | 7.2 | 8.1 | 7.4 |
| $MoO_3$ (weight %) | 0.09 | 0.1 | 0.03 |
| Nb (weight %) | 0.08 | 0.09 | 0.12 |
| As (weight %) | 0.09 | 0.09 | 0.04 |

It will therefore be readily understood by those persons skilled in the art that the present invention is suitable for broad utility and application and not limited to the utility industry. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements.

What is claimed is:

1. A method of regenerating a phosphorous-poisoned SCR catalyst, the method comprising treating the phosphorous-poisoned catalyst with an alkali metal hydroxide at a pH above 8.5.

2. The method according to claim 1, wherein the alkali metal hydroxide is sodium hydroxide, potassium hydroxide, or a combination thereof.

3. A method of regenerating a phosphorous-poisoned SCR catalyst, the method comprising treating the phosphorous-poisoned catalyst with an alkali metal hydroxide at a pH in a range of from above about 10 to about 14 and a temperature up to about 176° F.

4. The method according to claim 3, wherein the alkali metal hydroxide is sodium hydroxide, potassium hydroxide, or a combination thereof.

5. The method according to claim 3, wherein the phosphorous-poisoned catalyst is treated in a soaking bath, an ultrasonic treatment solution, or a combination thereof.

6. The method according to claim 5, wherein the bath or solution further comprises a surface active substance.

7. The method according to claim 3, wherein the catalyst is treated at a temperature in a range of from about 60° F. to about 140° F.

8. The method according to claim 7, wherein the catalyst is treated at a temperature in a range of from about 120° F. to about 130° F.

9. The method according to claim 3, wherein the pH is in the range of from about 12 to about 13.

10. A method of cleaning a phosphorous-poisoned SCR catalyst, the method comprising cleaning the phosphorous-poisoned catalyst with an alkali metal hydroxide by immersing the catalyst in a soaking bath, an ultrasonic treatment solution, or a combination thereof, wherein the soaking bath or ultrasonic treatment solution has a pH in a range of from about 10 to about 14 and a temperature in the range from about 60° F. to about 140° F.

11. The method according to claim 10, wherein the alkali metal hydroxide is sodium hydroxide, potassium hydroxide, or a combination thereof.

12. The method according to claim 10, wherein the temperature of the soaking bath or treatment solution is in a range of from about 120° F. to about 130° F.

13. The method according to claim 10, wherein the soaking bath or ultrasonic treatment further comprises a surface active substance.

14. The method according to claim 10, wherein the concentration of alkali metal hydroxide is from about 0.1 weight % to about 4 weight %.

* * * * *

UNITED STATES PATENT AND TRADEMARK OFFICE
CERTIFICATE OF CORRECTION

PATENT NO. : 7,741,239 B2  
APPLICATION NO. : 12/287365  
DATED : June 22, 2010  
INVENTOR(S) : Hartenstein et al.

Page 1 of 1

It is certified that error appears in the above-identified patent and that said Letters Patent is hereby corrected as shown below:

Title Page 2, Item (56) "Other Publications" section, line 9 delete "*Using*" and replace therewith --*Used*--.

Title Page 2, Item (56) "Other Publications" section, line 11 delete "Udenbrand, Appliwed" and replace therewith --Odenbrand, Applied--.

Column 3, line 66 delete "pre-wet washing" and replace therewith --wet pre-washing--.

Column 4, line 39 add a second ")" after --(EPRI 1014256)--.

Column 6, line 21 delete "$CaOH_2$" and replace therewith --$Ca(OH)_2$--.

Column 8, line 20 add "soaking" before --bath--.

Column 8, line 21 add "ultrasonic treatment" before --solution--.

Column 8, line 42 add "ultrasonic" before --treatment solution--.

Column 8, line 45 add "solution" after --ultrasonic treatment--.

Signed and Sealed this  
Twelfth Day of June, 2012

David J. Kappos  
*Director of the United States Patent and Trademark Office*